US005442153A

United States Patent [19]

Marantz et al.

[11] Patent Number: 5,442,153

[45] Date of Patent: Aug. 15, 1995

[54] HIGH VELOCITY ELECTRIC-ARC SPRAY APPARATUS AND METHOD OF FORMING MATERIALS

[76] Inventors: Daniel R. Marantz; David R. Marantz, both of 25 Cedar La., Sands Point, N.Y. 11050; Keith A. Kowalsky, 3012 Bond Dr., Merrick, N.Y. 11566

[21] Appl. No.: 209,160

[22] Filed: Mar. 10, 1994

Related U.S. Application Data

[62] Division of Ser. No. 576,632, Aug. 31, 1990, Pat. No. 5,296,667.

[51] Int. Cl.[6] .............. B23K 10/00

[52] U.S. Cl. .............. 219/121.47; 219/76.16; 219/121.52; 219/121.5; 219/121.59

[58] Field of Search .............. 219/121.47, 76.15, 760.16, 219/121.59, 121.5, 121.52, 75, 121.48, 74

[56] References Cited

U.S. PATENT DOCUMENTS

| | | | |
|---|---|---|---|
| 3.064,114 | 11/1962 | Cresswell et al. . | |
| 3,085,750 | 4/1963 | Kenshol . | |
| 3,140,380 | 7/1964 | Jensen . | |
| 3,546,415 | 12/1970 | Marantz . | |
| 3,672,428 | 6/1972 | Tommaney | 219/76.11 |
| 4,122,327 | 10/1978 | Vogts et al. | 219/76.16 |
| 4,125,754 | 11/1978 | Wasserman et al. | 219/121.5 |
| 4,302,483 | 11/1982 | Altorfer . | |
| 4,370,538 | 1/1983 | Browning . | |
| 4,604,306 | 8/1986 | Browning . | |
| 4,668,852 | 5/1987 | Fox . | |
| 4,740,395 | 4/1988 | Tsunekawa . | |
| 4,745,256 | 5/1988 | Shubert | 219/121.47 |
| 4,762,977 | 8/1988 | Browning . | |
| 4,788,503 | 11/1988 | Browning . | |
| 5,109,150 | 4/1992 | Rogers | 219/121.47 |

FOREIGN PATENT DOCUMENTS 9008203 7/1990 WIPO .

*Primary Examiner*—Mark H. Paschall

*Attorney, Agent, or Firm*—Howard & Howard

[57] ABSTRACT

A high velocity arc spray apparatus includes a transferred-arc-plasma torch assembly which forms a transferred-arc column. A metal feedstock is fed into the transferred-arc column at an angle such that no portion of the metal feedstock is closer to the transferred-arc-plasma torch assembly than the leading edge of the metal feedstock in the feeding direction. A power source is coupled to both the metal feedstock and transferred-arc-plasma torch assembly for creating an electrical potential difference between the metal feedstock and the transferred torch assembly.

11 Claims, 5 Drawing Sheets

HIGH VELOCITY ELECTRIC-ARC SPRAY APPARATUS AND METHOD OF FORMING MATERIALS

This is a divisional of application Ser. No. 07/576,632 filed on Aug. 31, 1990, now U.S. Pat. No. 5,296,667.

TECHNICAL FIELD

This invention relates generally to an electric-arc spray apparatus and methods of thermally spraying materials, and in particular, to a single wire fed electric-arc type spray system which utilizes a high velocity transferred plasma arc to produce extremely dense materials such as coatings and freestanding near-net-shapes as well as an apparatus for producing high density materials formed by thermal spraying which have superior metallurgical and physical characteristics.

BACKGROUND OF THE INVENTION

Thermal spray processes have been employed broadly in numerous industries to apply protective coatings to a variety of substrates including metal, ceramic, plastic and paper. More recently, thermal spray methods have been utilized for the fabrication of high-tech composite materials as coatings and as freestanding near-net-shape structures. By heating and accelerating particles of one or more materials to form a high-energy particle stream, thermal spraying provides a method by which materials starting in wire or powder form may be rapidly deposited on a substrate. While a number of parameters dictate the composition and microstructure of the sprayed coating or article, the velocity and temperature of the particles as they impact the substrate are important factors in determining the density and uniformity of the deposit.

One prior art thermal spray technique is the utilization of a combustion flame to spray metals and other materials, in powder, wire or rod form onto a substrate. A mixture of a fuel gas such as acetylene and an oxygen-containing gas (oxy-fuel) are flowed through a nozzle and then ignited at the nozzle tip. The material to be sprayed is metered into the flame where it is heated and propelled to the surface of the substrate. The feedstock may comprise a metal rod or wire which is passed axially into the center of the flame front or, alternatively, the rod or wire may be fed tangentially into the flame. Similarly, a metal powder may be injected axially into the flame front by means of a carrier gas. Some powder only combustion flame guns utilize a gravity feed mechanism by which a powdered material is simply dropped into the flame front. Conventional flame spraying, however, is typically a low velocity thermal spray process in the subsonic range and usually produces coatings which have a high degree of porosity.

Another spraying technique is known as plasma spraying. Plasma spraying utilizes a high-velocity gas plasma to spray generally powdered or particular material onto a substrate. To form a plasma, gas is flowed through an electric arc in the nozzle of a plasma spray gun, causing the gas to ionize into a plasma stream. The plasma stream thus formed is at an extremely high temperature, often exceeding 10,000 degrees C. The material to be sprayed, typically particles of about 20 to 100 microns, are entrained in the plasma and may reach a velocity exceeding mach 1. While plasma spraying can produce high density coatings, it is a complex procedure which requires expensive equipment and considerable skill on the part of an operator for proper application.

In another thermal spray technique known from U.S. Pat. No. 3,546,415, an electric arc is generated in an arc zone between two consumable wire electrodes. As the electrodes melt, the arc is maintained by continuously feeding the electrodes into the arc zone. The molten metal at the electrode tips is atomized by a blast of generally cold compressed gas. The atomized metal is then propelled by the gas jet to a substrate forming a deposit.

Conventional electric-arc thermal sprayed coatings are generally dense and reasonably free of oxide, however, the process requires that two consumable wires (electrodes) be fed to the spraying apparatus resulting in several disadvantages. Firstly, the spray gun, which is often desired to be lightweight and easily handleable, is bulky and cumbersome due to the number of heavy electrical power cables and electrically insulated wire feed conduits which are required. Also, instabilities in the spraying process occur due to unavoidable irregularities which are inherent in the process of feeding two wires simultaneously and precisely to the arc zone in the spray gun. Such wire feed instabilities result in inconsistent characteristics in the coating characteristics often detrimental to coating quality. In addition, since molten particles are initially formed from both an anode and a cathode, two distinctive particle size ranges are produced from the two electrodes, which is not conducive to forming a uniform coating structure.

An arc spray system known from U.S. Pat. No. 4,668,852, provides variation of the arrangement of flowing the atomizing gas through and around the arc-zone. However, this technique only provides improved atomizing, at subsonic velocities and also does not resolve the difficulties incurred because of dual-wire feed instabilities.

To improve the velocity of the atomizing gas, an arrangement was devised as known from U.S. Pat. No. 4,788,402 whereby a plasma jet is formed in a manner so that the plasma gas is accelerated to sonic or supersonic velocity as it exits the anode nozzle of the plasma torch. Two wires are simultaneously fed into the exiting, high velocity ionized gas stream at acute angles to the axis of flow of this plasma stream. These two wires are electrically energized with respect to each other and an arc is formed between the two wires, through the ionized plasma jet stream. Such an arrangement provides a means of atomizing the metal particles formed from the melting ends of the two wires at very high velocities which could be sonic or even supersonic. However, such an apparatus still requires the simultaneous feeding of two consumable wires, not resolving the instability problems associated with the simultaneous feeding of two wires.

A method is known from U.S. Pat. No. 3,140,380 to form several plasma streams angularly displaced around a central axis. A single wire is fed along the central axis of this configured multi-plasma torch and is melted by the heat of the plasma and the molten particles are atomized and propelled to a substrate to form a coating by the combined plasma streams at the converging point of these multiple plasma streams. In this configuration, the heat available to melt this single wire is only that which is obtained by convection from the plasma stream. Also, the velocity of the converging plasma streams is relatively low and therefore the atomizing and propelling of the metal particles occurs at low velocity, thereby not producing high density pore-free coatings.

A single wire arc apparatus and process is known from U.S. Pat. No. 3,064,114 in which a single wire is fed through the central axis of a plasma torch. This wire acts as a consumable electrode being fed into an arc chamber. An arc is struck between this wire and a coaxially aligned outlet nozzle. Gas is fed into the arc chamber, coaxial to the electrode wire, where it is expanded by the electric arc and causes a highly heated gas stream carrying metal from the electrode tip to flow through the nozzle. This jet of gas coaxial to the electrode wire also assists in converting the electrode wire tip which is being melted by the electric arc, into a stream of fine metal droplets.

It is also known from U.S. Pat. No. 3,085,750 to provide a metal plate in the pathway of the torch to bend and direct the flow path of the heated gas stream. There are several deficiencies with this type of metal spray process. Firstly, the velocity of this process is subsonic, yielding deposits which are quite porous and resulting coatings which are comprised generally of relatively large particles. Additionally, a great deal of difficulty can be encountered in preventing build-up of the metal droplets on the walls of the outlet nozzle.

An arrangement is known from U.S. Pat. No. 4,370,538 in which a single wire is fed at an acute angle into a plasma stream internally within a dual stream torch. A transferred-arc is established between the cathode of the plasma torch and the wire anode, thereby melting the tip of the wire. Sufficient gas flow in the plasma stream is established to help to initially atomize the molten metal at the wire tip. This gas flow is at a relatively low velocity but at high temperature and the initially atomized particles are subsequently moved into a second, cooler, very high velocity gas stream for further atomization and acceleration. This second gas stream is derived from combusting an oxy-fuel mixture in a separate combustion chamber which is also an integral part of the proposed thermal spray torch. The hot combustion product, gas, is directed to coaxially combine with the plasma stream containing the partially atomized molten metal particles. One of the drawbacks of such an apparatus is the high degree of complexity of the equipment of combining several processes (plasma, combustion and wire arc) in one assembly along with the extremely fine balance of control of these three processes to get them to work in harmony with each other. In addition, the operation of such an apparatus is very expensive, requiring large consumptions of fuel gas and oxygen. Additionally, when the wire is fed at an acute angle into the plasma stream and an arc is struck between the wire tip anode and the cathode electrode of the plasma torch, secondary arcs (double arcing) can randomly occur between the wire and the anode nozzle of the internal plasma torch. Double arcing is a condition in which a shorter electrical path is found for the transferred-arc current to flow from the cathode electrode through internal arcing within the torch to a second arc which will form between a point on the outer surface of the torch and the wire. Such secondary (double) arcs can be destructive to the internal plasma torch and to the overall spray torch.

Another system is known from U.S. Pat. No. 4,604,306 in which two separate torches are employed, namely a plasma torch and a high velocity combustion torch. The plasma torch is described as a transferred-arc type torch in which an arc is struck between the cathode electrode of the torch and the tip end of a wire which is fed into an initially formed pilot plasma stream at an acute angle relative thereto. The molten particles which are partially atomized and accelerated from the transferred-arc zone are injected into a quiescent zone" formed at the exit of a high velocity oxy-fuel gun. The same disadvantages apply to this configuration as those pertaining to U.S. Pat. No. 4,370,538 previously mentioned. Since the wire is fed into the plasma stream at an acute angle, secondary arcing between the wire and the plasma torch anode pilot nozzle commonly occur due to this physical configuration resulting in damage and destruction of the plasma torch. In addition, the apparatus is complex requiring critical mechanical alignment between the plasma torch and oxy-fuel combustion torch and the process is very costly to operate.

One solution to the problem of secondary arcing is known from U.S. Pat. No. 4,762,977. A high velocity annular gaseous sheath is formed concentrically about the transferred-arc column to form an arc column guide restricting the arc column to within a region closely spaced radially from the axial extension of the nozzle, such that the arc column cannot penetrate this sheath. When the wire motion is stopped or the wire is withdrawn from the arc-zone, the arc to the tip of the wire is extinguished by the cold, high velocity annular gas flow. This solution to secondary arcing creates greater complexity and bulkiness to the spray apparatus as well as increasing the operating cost of such a system by requiring an additional high volume of high velocity flow of compressed air. In addition, it is not always useful to have a high volume of high velocity cold air impinging on the coating being formed on the substrate and can actually be detrimental to achieving the highest quality of coating characteristics.

Prior art thermal spray methods have been used to form composite materials by simultaneously spraying two or more distinct materials. Ceramic-ceramic composites, ceramic-metal composites known as "cermets", and metal-ceramic composites, known as "metal-matrix composites" have been formed as coatings and as free-standing near-net-shape articles. Materials may also be fabricated by forming a first particle stream using one spray gun and then combining the first stream with a particle stream from another gun to form a combined spray at the target surface.

A method of manufacturing a composite material by combined melt-spraying is known from U.S. Pat. No. 4,740,395. The use of a conventional single-wire combustion spray gun to melt and spray the main constituent metal onto a substrate is combined with an injection means which injects discontinuous fibers as a reinforcing material, together with compressed air into the metal spray wherein the discontinuous fibers are mixed into the metal spray. A composite material is thus formed on a substrate. The limitations of this type of technique are that the resulting deposits contain oxide formations surrounding each metal particle as well as a high degree of porosity resulting from the low-velocity nature of the process. Both of these factors result in deposits which do not have superior properties. In addition, the use of two separate spray guns to form composite coatings is difficult and unwieldy. It would therefore be desirable to provide a single spray gun which could be used to form composite materials such as metal-matrix composites which are high density essentially oxide free deposits.

Another means of thermal-spray forming composites such as metal-matrix composite materials as a coating or as freestanding near-net-shape articles, is described in currently pending U.S. patent application Ser. No. 07/247,024 of co-inventor Daniel R. Marantz. This device combines in a single apparatus a high velocity (operating in the trans-sonic range) oxy-fuel type spray gun with a two-wire electric-arc spray head. In this apparatus, the high velocity combustion products are directed at the arc-zone established between the two wires, where it acts to atomize and propel the molten metal formed in the arc, from the two wires to a substrate or article to be coated. Simultaneously, a powder feedstock of the reinforcement particles is fed into the combustion process within the high velocity oxy-fuel (HVOF) gun. This reinforcement particle, typically a refractory oxide or carbide, is heated and accelerated within the HVOF gun and is combined with the metal particles formed from the two-wire electric-arc. As the metal and reinforcement particles imbed themselves into the substrate, they are subsequently covered up by the splatting metal particles. This process produces a high density composite coating or bulk metal-matrix composite material.

There are several limitations and drawbacks to this process. First, since an oxy-fuel process is employed, large amounts of oxides are formed, surrounding each of the metal-matrix particles. This oxide formation weakens the interparticle bonding, thus forming a metal-matrix which is mechanically inferior to the wrought starting material. In addition, since the mechanism of reinforcement particle loading in the metal-matrix is based on the impact of the hot particle onto the coated surface, the hardness of the metal-matrix material employed plays an important role in how much, if any, reinforcement particle imbeds itself into the metal-matrix. Loading of reinforcement into the metal-matrix does not occur at all in harder materials such as steel and nickel based alloys. Only very low loading (less than 5%) are obtainable in medium hardness materials such as copper and its alloys. In softer materials, such as aluminum and aluminum alloys, reasonable loadings of 10 to 15 percent can be obtained. However this appears to be the limiting degree of loading obtainable.

Another method for thermal spray forming composites is known from U.S. Pat. No. 4,762,977. In this method a single wire is fed at an acute angle into a plasma stream in which a transferred-arc is established between the plasma stream and the tip of the wire. Simultaneously, a stream of carrier gas carrying powder feedstock is directed into the plasma upstream from the wire (between the plasma anode nozzle and the tip of the wire). The powder feedstock thus injected combines with the melted metal particle formed on the tip of the wire and each are propelled to the substrate all together, thus forming a composite structure in the resulting coating. However, since the powder particles and carrier gas are injected upstream from the tip of the melting wire, the cold carrier gas and entrained particles impinging into the transferred-arc causes the plasma stream to be cooled which, combined with the kinetics of interaction of the carrier gas stream and the plasma gas stream causes erratic arc conditions resulting in large non-uniformity in the resulting composite coating. Also, because of these interacting conditions and the resulting loading, the percent of secondary material included within the metal-matrix is limited to a low level.

Accordingly, it is desirable to provide a single wire electric spray gun which may be used to form composite materials such as metal-matrix composites and which achieves the benefits of supersonic plasma-arc powder and wire spraying.

SUMMARY OF THE INVENTION

Generally speaking, in accordance with the invention, a high-velocity thermal spray apparatus utilized to form composites, including metal-matrix composites, includes a plasma torch which can produce a supersonic plasma jet stream. The torch includes a cathode. A metal wire is continuously fed at an angular position at an angle perpendicular to the axis of the plasma-jet stream. A transferred-arc is established between the wire tip which acts as an anode and the cathode electrode contained within the plasma torch causing the wire tip to melt as it is continuously fed into the plasma. The molten metal thus formed is accelerated, atomized and propelled to a substrate by the supersonic plasma jet stream.

In another embodiment, the apparatus includes a single wire oriented at least perpendicularly to a plasma jet stream to which it has established a transferred-arc. The end of the wire is continuously fed into the transferred-arc. A feed of powdered feedstock is fed by a carrier gas stream from a direction 180 degrees angularly displaced from the direction of the wire feed and oriented to intersect with the plasma-jet stream downstream from the axis of the wire feed.

In another embodiment, the plasma torch includes a cathode electrode mounted coaxially within an electrically insulating member at one end of a cylindrical metal body, closing off the end of the cylindrical body. An axial bore forming a nozzle is provided at the other end of the body. The cathode electrode is coaxial with the nozzle passage or bore and within an annular chamber. A plasma forming gas is introduced into the annular chamber where it flows, preferably as a vortex flow, through the nozzle. A cup-shaped member concentrically surrounding the outside of the metal body forms an annular space between the end of the cup-shaped member and the cylindrical metal body. One end of the cup-shaped member is closed off forming an end wall while the opposite end is open. Compressed gas is fed into the annular space for discharge through the open end of the cup-shaped member forming a converging flow of compressed gas such that the convergence point is beyond the wire feed point, being downstream from the wire, thereby minimizing any turbulence which otherwise might effect the stability of the plasma jet stream. A wire, rod or strip of metal is fed perpendicularly into a developed plasma arc column emanating from the nozzle of the plasma torch. An electrical potential difference is developed between the wire which acts as an anode, and the cathode electrode within the plasma torch, from a DC electrical source. Molten droplets of metal formed from the tip of the wire are initially atomized and accelerated by the supersonic plasma jet developed between the cathode electrode and the anode wire. Additional atomizing and acceleration is effected by the converging gas discharge from the cup shaped member.

In another embodiment of the invention, a rotating disk of feedstock material may be substituted for the wire, rod or strip feedstock. The edge of the rotating disk is aligned so that the center of the disk is radially disposed from the axis of the plasma jet by a distance equal to the radius of the disk and the plane of the face of the disk is perpendicular to the axis of the plasma jet. As the disk is rotated, a transferred-arc is established between the cathode electrode of the plasma torch and the edge of the disk which is electrically charged as an anode. The edge of the disk will be continuously melted and the melted droplets thus formed will be atomized and accelerated by the impinging supersonic velocity plasma-jet. A rack and pinion is provided for moving the disk so that the edge of the rotating disk is melted away as the radial position of the center of the rotating disk is continuously adjusted to maintain the edge of the disk properly located with respect to the axis of the plasma-jet. As an alternate embodiment, two rotating discs can be employed such that the tangential contact point of the two rotating discs is maintained aligned on the axis of the plasma-jet. Both rotating discs are electrically charged as anodes and a transferred-arc is established between the two disk anodes and the cathode electrode within the plasma torch. The molten droplets thus formed from the simultaneous melting of the edges of the two discs is then atomized and accelerated by the supersonic plasma-jet.

In another embodiment of this invention, a bar or plate of feedstock material may be employed in replacement for the wire, rod or strip form of feedstock. One edge of the plate is aligned with the axis of the plasma-jet while the plane of the plate is perpendicular to the plasma-jet axis. The plate is fed in a reciprocating manner with respect to the plasma-jet axis. A rack and pinion is provided to move the plate so that a transferred-arc is established with the edge of the plate, causing the edge to continuously melt the molten droplets thus formed being atomized and accelerated by the supersonic plasma-jet. As the plate is moved, the position of the edge of the plate must be continuously adjusted in order to maintain the proper position of the plate edge with respect to the axis of the plasma.

In another embodiment of the present invention, a wire is fed coaxially on the centerline of a bore to be thermally spray coated. A plasma torch of the type previously described as a part of this invention is radially disposed with respect to the axis of the wire and supported on a member capable of rotating this plasma torch around the wire. The axis of the plasma torch is maintained at all times during rotation at a perpendicular position relative to the axis of the wire. Rotating fittings are provided to carry the necessary gases and electrical power to the rotating plasma torch. A transferred-arc plasma is established between the cathode electrode within the plasma torch and the wire which is continuously fed to sustain this transferred-arc. The transferred-arc is continuously sustained as the plasma torch is caused to rotate concentrically around the wire axis, thus causing the continuous melting of the tip of the wire while the plasma-jet is simultaneously atomizing and accelerating the molten droplets formed on the end of the wire and propelling them against the wall of the bore. A structure is provided for the axially reciprocating the plasma torch within the bore while rotating the plasma torch, thereby providing a continuously uniform coating on the internal surface of a cylindrical bore.

Accordingly, it is an object of the invention to provide an improved high velocity electric-arc spray apparatus.

A further object of the invention is to provide a single wire electric-arc spray apparatus and process in which a supersonic plasma jet is created which is employed as an electric contacting means to a metal wire as well as acting to atomize and propel molten metal particles to a substrate to form a high density coating while eliminating the occurrence of secondary arcing.

Yet another object of the invention is to provide a single wire plasma arc spray apparatus and powder feed to produce a metal-matrix composite coating and free-standing near-net-shape materials of uniformly distributed secondary material within the metal-matrix while consistently and reliably controlling the degree of loading over a very broad range.

Yet another object of the invention is to provide a high velocity electric-arc spray apparatus which eliminates secondary arcing between a wire feed and nozzle.

Still another object of the invention is to provide a high velocity single wire thermal spray apparatus which is simple in construction and may be operated at relatively low gas consumption and is relatively maintenance-free.

A further object of the invention is to provide a method and apparatus for producing high performance well bonded coatings which are substantially uniform in composition and have a very high density with very low oxides content formed within the coating.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
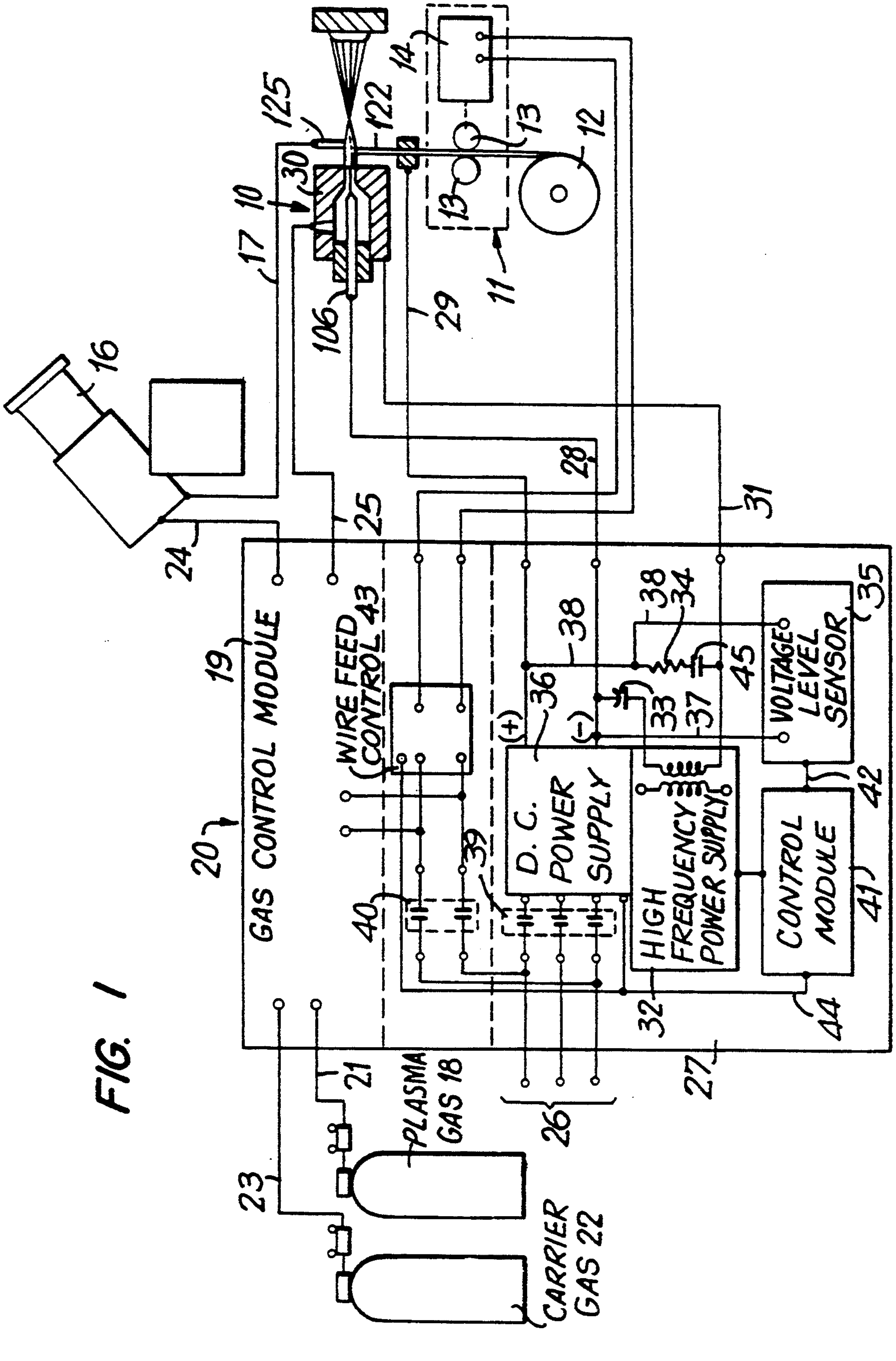
FIG. 1 is a schematic diagram of a high velocity electric-arc spray apparatus constructed in accordance with an embodiment of the invention which includes both wire feed and powder feedstock feed.

Reference is first made to FIG. I in which a high velocity electric-arc spray apparatus constructed in accordance with the invention includes a transferred-arc-plasma (TAP) torch assembly 10. A main control and power supply console (main console) 20 controls operation of TAP torch assembly 10 and includes a gas control module 19, a wire feed control 43 and a power supply 27. A plasma gas 18 is fed to TAP torch assembly 10 by gas control module 19 while power is supplied to TAP torch assembly 10 as well as a wire 122 to form an arc between TAP torch assembly 10 and wire 122.

Wire 122 is fed at a position at least perpendicular (90°) to the central axis of TAP torch assembly 10. Wire 122 is fed from a wire source 12 by a wire feed assembly 11. Wire feed assembly 11 includes wire feed rolls 13 disposed on opposed sides of wire 122 and which are driven by a motor 14. Wire feed assembly 11 is controlled by wire feed control 43.

A plasma gas is supplied from a compressed gas source 18 to gas control module 19 of main control and power supply console 20 through gas hose 21. The plasma gas exits gas control module 19 through a gas hose 25, the other end of which is connected to TAP torch assembly 10.

Electrical power is brought to the system through the main console 20 at an input 26 where it is transformed and converted to DC electrical power within the power supply portion 27 of the main console 20. The electrical input is input through control contactors 39 to a DC power supply 36.

Figure 2:
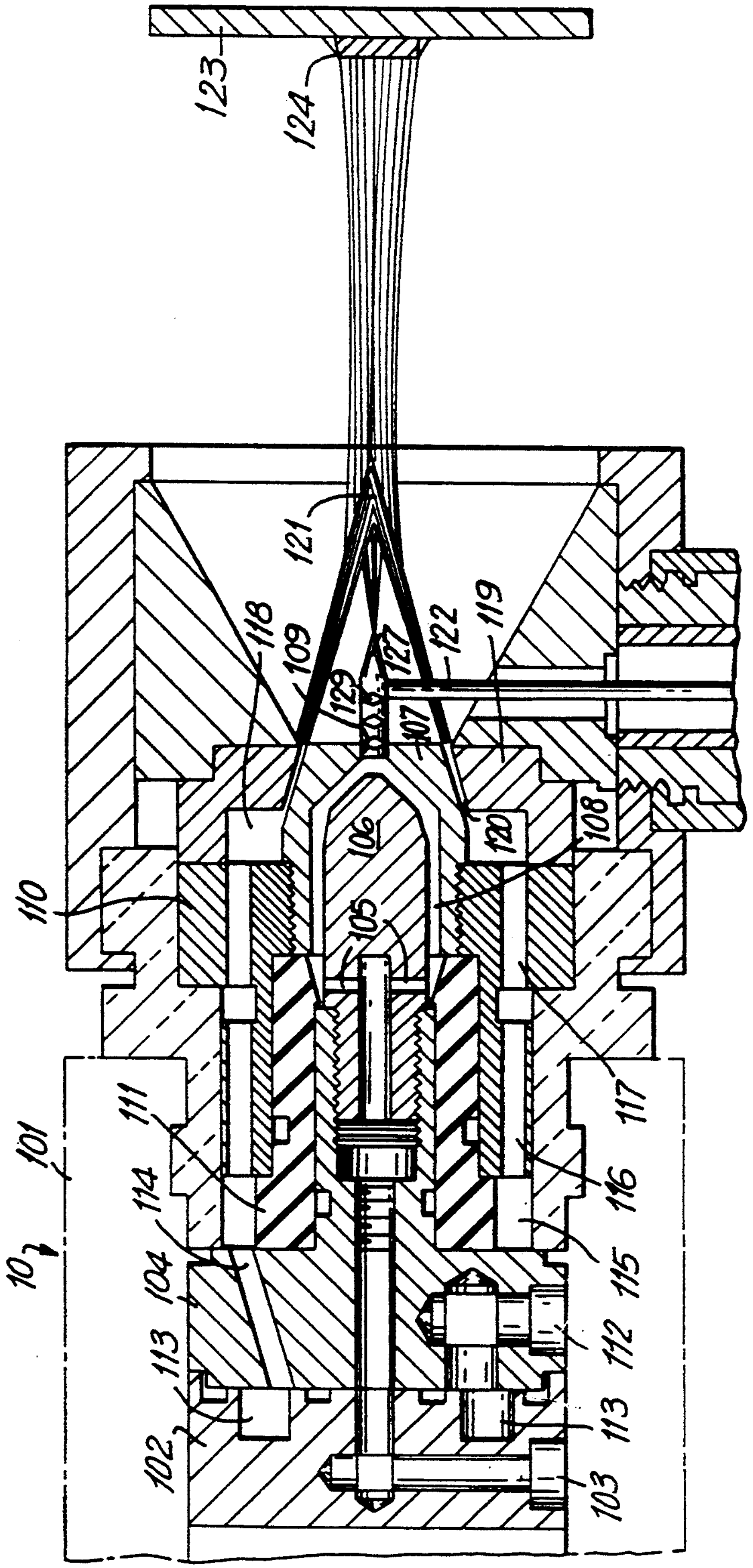
FIG. 2 is an enlarged cross-sectional view of a transferred-arc plasma torch constructed in accordance with an embodiment of the invention which includes only the wire feed.

Reference is now also made to FIG. 2 in which an enlarged view of TAP torch assembly 10 is shown. TAP torch assembly 10 includes a housing 101. A plasma gas inlet block 102 is disposed within housing 101 coaxially with a cathode support 104. A cathode 106 is disposed within cathode support 104 coaxially therewith. A cup shaped pilot nozzle 107 is disposed about cathode 106. Cathode support block 104 is coaxially aligned within pilot nozzle support block 110 and electrically insulated from nozzle support block 110 through an insulating sleeve 111 disposed therebetween.

Plasma gas inlet block 102 is formed with a gas inlet port 103 which receives the plasma gas and provides its passage through cathode support 104 exiting through tangentially oriented ports 105 formed within cathode 106. Ports 105 communicate at a right angle with a chamber 108 formed between cathode electrode 106 and the inner surface of cup shaped pilot nozzle 107. As the plasma gas exits the tangential ports 105 into chamber 108 it forms strong vortex flow around cathode 106 and exits pilot nozzle bore 109 formed within pilot nozzle 107.

A cup shaped atomizing nozzle 119 is disposed about plasma nozzle 107. A secondary compressed gas is fed into a gas input port 112 located on cathode support block 104. The secondary gas passes through a passage in block 104 distributing itself in manifold chamber 113 before passing through multiple passages 114 in block 104 before entering and distributing itself in chamber 115. From chamber 115 the secondary gas passes through multiple sets of passages 116 and 117 and into a manifold 118. The secondary gas, now very uniformly distributed within manifold 118, exits through the conical passage 120 formed between the outside surface of the pilot nozzle 107 and inner surface of atomizing nozzle 119 causing a converging flow of secondary gas, converging at a point 121 which is located at a distance of approximately 24 mm from the face of the pilot nozzle 107.

The negative output of the power supply 27 is connected through lead 28 to central cathode electrode 106 of the TAP torch assembly 10. The positive output of power supply 27 is connected to the wire 122 through electrical power lead 29 so that wire 122 is an anode. An additional positive connection to power supply 27 supplies pilot power to the main body 30 of TAP torch assembly 10 through electrical power lead 31. High frequency generator 32, contained within the power supply 27, is connected to the negative output connection of power supply 27 through capacitor 33 which acts to block the DC negative power output of the DC power supply 36 and pass the high frequency power. The other side of high frequency generator 32 is directly connected to the PILOT output connection of power supply 27 and is also connected through a pilot dropping resistor 34 and contact switch 45 to the positive output connection of power supply 27.

A voltage level sensor 35 is located within the power supply, its input being connected to the output of the DC power supply 36 by leads and 37 and 38. The output of the voltage level sensor is connected to a control module 41 through central cable 42. The output of the control module 41 is connected to the wire feed control 43 and the DC power supply 36 by control cable 44 which ultimately controls the "ON and "OFF" functions of the control contact switches 40 and 39, respectively for turning wire feed 11 and DC power supply 36 OFF as needed.

Wire 122 is fed towards the central axis of TAP torch assembly 10 at an angle of at least 90° relative thereto. The central axis of the wire 122 is spaced approximately 4.5 mm from the face of the pilot nozzle 107. The cathode block 104 is electrically energized with a negative charge and the wire 122 is electrically charged with a positive charge. Pilot nozzle 107 is electrically energized from the pilot output from the power supply 27.

To initiate the operation of the system, after operating an ON control switch, plasma gas 18 is caused to flow through gas module 19 through hose 25 to TAP torch assembly 10. After an initial period of time, typically two seconds, DC power supply 36, high frequency supply 32 and the associated contact switch 45, and wire feed control 43 are energized simultaneously causing a pilot plasma to be momentarily activated. During operation, with plasma and secondary gases flowing and the power supply 27 energized, a non-transferred plasma is initially formed by an arc current established between the cathode tip 106 and pilot plasma nozzle 107, through the low pressure region in the center of the vortex flow of plasma gas, exiting the pilot plasma nozzle. Once this non-transferred plasma is established, a stream of hot, ionized electrically conductive gas flows out from the pilot nozzle 107, contacting with the tip of wire 122 to which a transferred-arc 127 is formed establishing a plasma current to flow from cathode electrode tip 106 through the low pressure center region of the vortex flow through the pilot plasma nozzle 107 which acts as a constricting orifice to the tip of wire 122. Wire 122 is continuously fed by wire feed assembly 11 into the emanating plasma stream thus sustaining the transferred-arc even as the wire tip is melted off.

Instantly, with establishment of the transferred-arc, the high frequency supply 32 is de-energized as pilot contact switch 45 is opened. As wire 122 is continuously fed by wire feed assembly 11, the tip of wire 122 is melted by the intense heat of the transfer arc and its associated plasma 127. Molten droplets are formed on the tip end of wire 122 which are accelerated and initially atomized into fine molten particles by the viscous shear force established between the high, supersonic plasma jet velocity and the initial low velocity of the molten droplets. The molten particles are further accelerated and atomized by the much larger mass flow of secondary gas which converges at converging zone 121 beyond the flow of the plasma stream 127 now containing the finely divided, accelerated particles of molten material. The particles are further accelerated, atomized and propelled from converging zone 121 to substrate surface 123 where deposit 124 forms.

During operation of the system, in the event of a hesitation or halting of the wire feed, melt-back of wire 122 will occur. This hesitation in wire feed can randomly occur due to certain wire-feed inconsistencies caused by such things as a kink in wire 122 or the like. In addition, if the wire feed is stopped, such as at the end of the operational cycle, melt-back will also occur. When melt-back occurs, the transferred-arc length is extended so as to sustain itself between cathode 106 and receding wire 122. As this occurs, damage and destruction to the pilot plasma nozzle 107 will occur in addition to the damage and destruction that will be inflicted on the wire-guide tip (not shown) which supports and guides wire 122 to its appropriate position.

This melt-back will occur since the power supply employed in the operation of the apparatus of the present invention has constant current characteristics. Constant current characteristics dictate that a preset electrical current will be maintained over a broad range of conditions by automatically adjusting the voltage in order to maintain this set current. The wire 122 is fed at a position which is 90° or greater, to the axis of TAP torch assembly 10. As such, as melt-back starts to occur, the transferred-arc voltage starts to increase due to a longer arc length which is forming. A voltage level sensor 35, which is part of the power supply 27 senses the increased voltage and at a predetermined voltage level, the voltage level sensor de-energizes the DC power supply 36 as well as the wire feed control 43 preventing damage to the apparatus.

Figure 7:
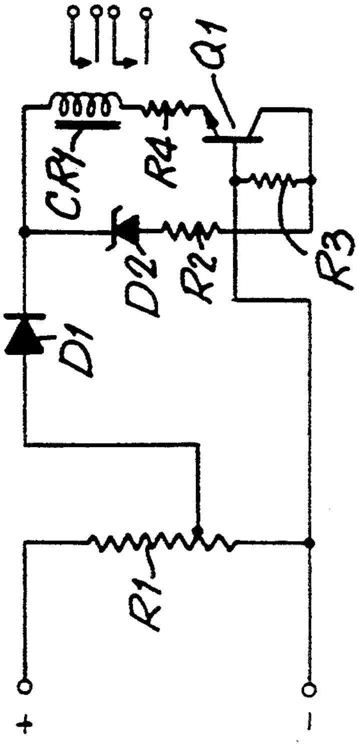
FIG. 7 is a circuit of a voltage level sensing circuit constructed in accordance with the invention.

Reference is made to FIG. 7 in which a voltage level sensor circuit suitable for use in the present invention is provided. Voltage level sensor circuit 35 receives a positive and negative input from DC power supply 36. A resistor $R_1$ is connected across the positive and negative inputs. A first diode $D_1$ is coupled between resistor $R_1$ and an inducting coil $CR_1$. A second diode $D_2$ is coupled in series with the second resistor $R_2$ between a resistor $R_3$ and the junction between the cathode of $D_1$ and inductor $CR_1$ at its cathode. Resistor $R_3$ is coupled between the negative output of the DC power supply 36 and resistor $R_2$. A transistor $Q_1$ is coupled to resistor $R_3$ at its collector, through resistor $R_4$ to inductor CR1 at its emitter and to the negative output of DC power supply 36 at its base.

By providing a high velocity thermal spray apparatus which feeds a wire perpendicular to the axis of the plasma jet thereby maintaining the arcing distance sufficiently great so that the closest electrical pathway to the wire is at its tip, it is not possible for secondary arcs to form between any point along the wire extending radially from the axis of the plasma jet and any point on the face of the pilot plasma nozzle (anode) of the plasma torch. As the wire is withdrawn from the axis of the plasma jet, the distance between the tip of the wire and the face of the pilot plasma nozzle remains either constant or increases with greater degrees of withdrawal. This is a benefit over the prior art which utilizes acute angles of wire feed which provide sections where the wire is closer to the pilot plasma nozzle than at the tip, leading to double arcing. Additionally, since it is characteristic of plasma arcs that, as the arc length increases, the arc voltage increases proportionally, by providing an arc-voltage sensing circuit, as the wire is withdrawn from the plasma jet and the arc voltage increases, the voltage sensing circuit will cut off the power to the plasma torch at a predetermined voltage as well as stopping the wire feeder, thereby preventing the transferred-arc from extending or secondary arcs forming, either of which conditions are otherwise destructive to the spray apparatus.

The physical configuration of the angular positioning of wire 122 with respect to the central axis of the TAP torch assembly 10 in conjunction with voltage level sensing and control are central features of the present invention, making practical the use of a TAP torch assembly 10 while preventing damage and/or destruction of components of TAP torch assembly 10 which are =a critical to its operation and performance.

Figure 3:
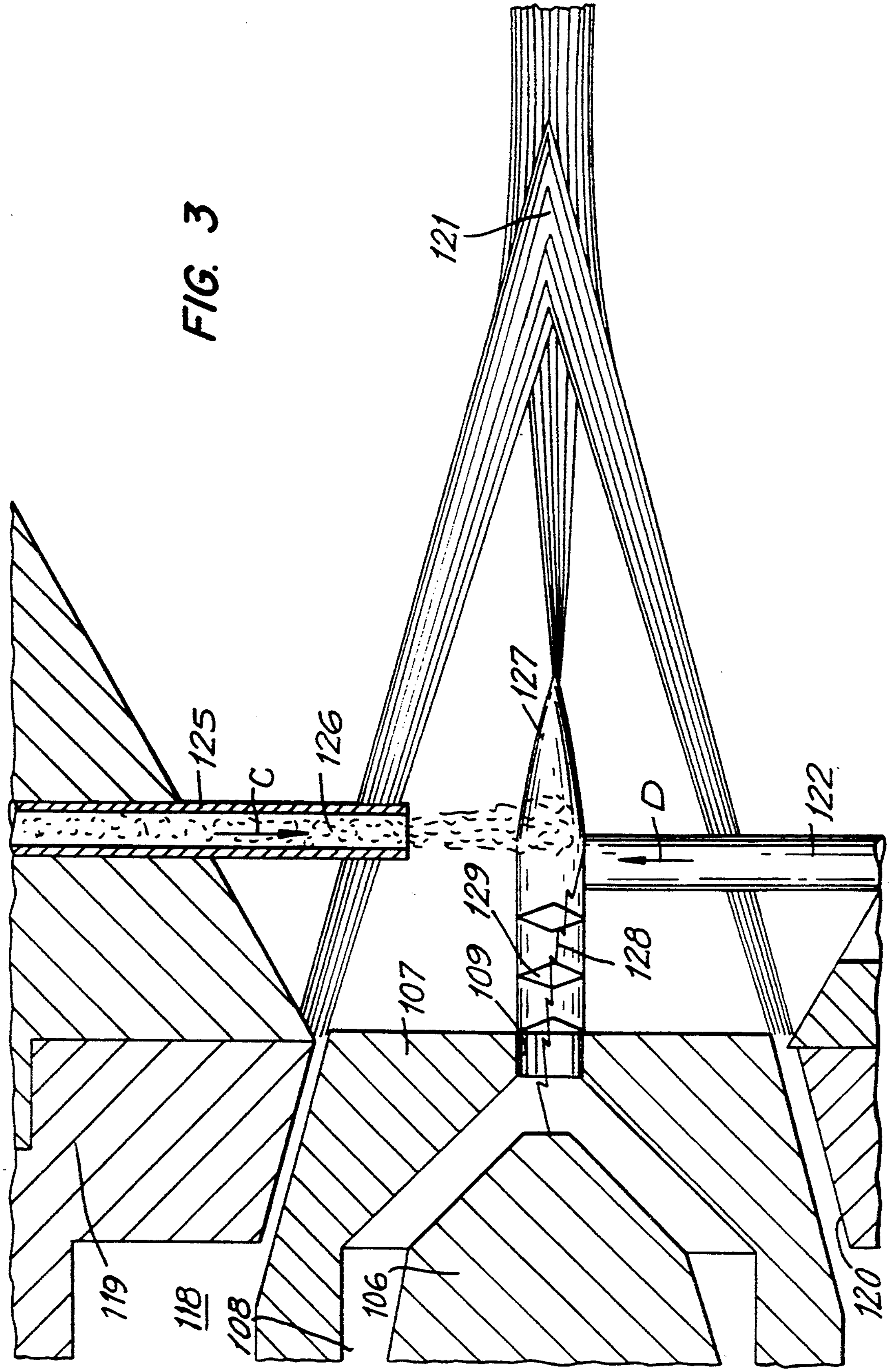
FIG. 3 is an enlarged cross-sectional view of the transferred-arc plasma torch of the embodiment of FIG. 1.

Reference is now made to FIGS. 1 and 3 in which a preferred embodiment of the invention is shown. Like numbers are utilized to indicate like parts, the difference between the embodiment of FIG. 2 and that of FIG. 1 being the inclusion of a powder tube feed for implanting impurities into the metal to form a metal-matrix composite.

A powder injection tube 125 through which a powder feedstock material is fed in the direction of arrow C is disposed 180° from wire 122 so as to be on the opposed side of plasma jet 127. A powder feeder 16 is coupled to powder feed tube 17. A carrier gas is supplied from a compressed gas source 22 through gas hose 23 to gas control module 19 of main console 20. The carrier gas exits gas control module 19 through a gas hose 24 to powder feeder 16. Powder feeder 16 is coupled to powder injection tube 125 by powder feed tube 17. By providing a metal wire thermal spray apparatus having a powder feedstock injection means in this manner, high density, metal-matrix composites can be spray formed.

As seen in FIG. 3 powder injection tube 125 is located 180° from the wire 122 and its central axis is also oriented 90° from the axis of TAP torch assembly 10. Furthermore, the central axis of powder injector tube 125 is located at least a distance equal to the radius of wire 122 downstream from the central axis of the wire 122 along the plasma path. In an exemplary embodiment, powder injector tube 125 is at least 1 mm downstream of wire 122. Powder particles suspended in a carrier gas 126 are injected through the plasma stream 127 directly into the large molten droplets formed on, and moving away from the melting tip of wire 122. As these powder particles impact the molten droplets, they include themselves in the molten droplets. These molten droplets with powder particles included are carried away, first by the plasma stream 127 and then by the converging secondary gas at the converging zone 121 and from there to the substrate 123 (FIG. 2), forming a coating 124 which in this embodiment would be a high density metal-matrix composite having the powder particles uniformly distributed throughout the deposit Referring further to FIG. 3, the flow of the transferred-arc current 128 is more clearly seen established between cathode electrode 106 and the tip of wire 122 which sustains the plasma stream 127. Mach diamonds 129 can be observed when proper energy input and plasma gas flows are established indicating that the plasma stream 127 has gas velocities which are supersonic.

One of the many advantages provided by the present invention is the ability to inject the powder feedstock directly into the forming molten metal droplets which permits the joining of the powder feedstock and metal-matrix while the matrix material is in a molten or liquid state thereby eliminating any interdependence on the hardness of the metal-matrix and the degree of loading for such metals as steel or the like. Also, by varying the relative feed rates of the powder feedstock, a very broad range of loading of the powder feedstock in the metal-matrix is obtainable employing a wide range of selection of metal-matrix materials. In addition, by injecting the powder feedstock downstream from the central axis of the wire 122, turbulence of the plasma, and thereby erratic transferred-arc conditions, caused by the injection of powder and a cold carrier gas, is avoided. Additionally, by increasing the degree of loading, the strength of the resulting metal-matrix composite is increased.

A number of plasma and secondary gases may be used in the present invention. The choice of the plasma and secondary gas is dictated by a number of factors including availability, economy, and, most importantly, by the effect which a particular gas has on the spraying operation in terms of the metallurgical and physical characteristics of the spray deposit as well as the rate of deposit. For the plasma gas, compressed air is preferred for use as well as for the secondary gas, particularly for the reason of economy. Such other gases as nitrogen, argon or mixtures of either of these two gases with, as an example, hydrogen or helium can also be very useful especially when it is desired to produce coatings containing little or no oxide formations.

In forming composites, including metal-matrix composites, the high velocity thermal spray apparatus includes in one embodiment a fluid feed means for feeding a feedstock, preferably a powdered (particulate or short fiber) feedstock directed into the plasma stream and positioned so that the central axis of the powder feed stream is downstream from the axis of the wire feed, into the molten metal droplets being accelerated and atomized from the tip of the wire. Many of the powder particles will include themselves into the larger droplets of molten metal at this stage. The resulting composite coating or bulk material thus formed is substantially fully dense as thermally sprayed and the composite is substantially uniform in composition.

Where the high velocity thermal spray apparatus is used to form a metal-matrix composite, the powdered or particulate feedstock may be, for example, a refractory material, including refractory oxides, refractory carbides, refractory borides, refractory silicides, refractory nitrides and combinations thereof and carbon whiskers. The wire feedstock in the disclosed embodiment may be any metal or electrically conductive material in wire, rod, strip, fluid or liquid form. Thus the high velocity thermal spray apparatus and methods of this invention may be utilized to form various substantially fully dense and substantially uniform metal-matrix composites, many of which cannot be formed by other known methods of thermal spraying.

It should be noted that the present invention is particularly adapted to permit control of plasma gas temperature and plasma gas enthalpy by proper selection of plasma gas as well as by controlling gas pressures. By controlling the composition of the plasma gas and the gas pressure, a wide range of particle velocities can be attained, thereby tailoring the characteristics of the resulting deposit. The preferred plasma gas pressure range is from about 20 to about 150 psig and more preferably from about 40 to about 100 psig. When operated within these ranges, velocities of the emerging plasma gas stream from the pilot plasma nozzle bore 109 will be supersonic when a corresponding pilot plasma nozzle bore diameter is selected in conjunction with a particular gas pressure and energy input setting. Pilot plasma bore diameters in the range of 1 to 3 mm have been found to be the preferred range, corresponding to transferred-arc currents ranging from 20 amperes up to 200 amperes. It will be appreciated that the nature of the plasma gas, its mass flow and the energy input, closely dictate velocity.

With reference to the embodiment of the present invention which is a method and apparatus for forming metal-matrix composite deposits, illustrated in FIG. 3, the TAP torch assembly 10 operates similarly to that described previously herein and in FIG. 2. A powder injection tube 125 is now added in this embodiment and as a central feature to this invention, its location and orientation must be critically defined in an exemplary embodiment. The location of the central axis of the powder injector 125 is located 180° opposite from the central axis of wire 122 and at least 1 mm downstream from the axis of wire 122 and should also be oriented at 90° or greater to the central axis of the TAP torch assembly 10

In operation, after the transferred-arc 128 is established, wire 122 is continuously fed by wire feed assembly 11 in the direction of arrow D. Simultaneously, carrier gas 126 is caused to flow from powder feeder 16 through powder hose 17 into powder injection tube 125, from which it is directed into plasma stream 127 in the direction of arrow C. Because powder injection tube 125 is located directly opposite the end of wire 122 and slightly downstream, as the powder particles and carrier gas 126 are injected into plasma stream 127, the powder particles attach to and are included into the larger molten droplets of metal-matrix which is flowing from the tip end of wire 122. This condition is the central feature of this embodiment of the present invention.

In the prior art technology, the powder particles are generally added up stream from the source of molten metal particles and are generally directed so that there is a mixture of individual particles of metal and powder which are propelled to the substrate to form a metal-matrix composite deposit. Also, the powder particles have a significantly different velocity in transit to the substrate compared to the velocity of the molten metal particles. In the embodiment of the present invention, the velocity of the molten metal droplets on the tip end of wire 122 is essentially initially zero and are accelerated from this point toward the substrate by the plasma stream. The injected powder particles are injected 90° to the axis of the plasma stream and therefore have initially a zero velocity in the direction towards the substrate.

Establishing initially equal velocities of the metal and powder particles in addition to having many of the powder particles included within the molten metal droplets provides much greater versatility and greatly improved characteristics of the resulting metal-matrix composite deposit formed by the method and apparatus of the present invention over the prior art.

Wire 122 is formed of a metal which may be an alloy. Suitable metals used in fabricating metal-matrix composites include, titanium, aluminum, steel, and nickel and copper based alloys. Any metal can be used if it can be drawn into wire form. Powder cored wires may also be suitable. The flow rates of the materials are controlled by regulating the injection rate of the powder feedstock or the rate at which the wire is fed. Numerous powdered materials may be employed in the operation of the present invention which include metals, metal alloys, metal oxide such as titania, alumina, zirconia, chromia, and the like and combinations thereof; refractory compounds such as carbides of tungsten chromium, titanium, tantalum, silicon, molybdenum, and combinations thereof; silicides and nitrides may also be used in some applications. Various combinations of these materials may also be suitable. These combinations may take the form of powdered blends, sintered compounds or fused materials. The preferable particle size range of the feedstock powder ranges from about 5 microns to about 100 microns, although diameters outside this range may be suitable in some applications, the preferred average particle size is 15 to about 70 microns.

The present invention further comprises coatings and near-net-shapes formed in accordance with the method of the present invention. As will be known to those skilled in the art, freestanding near-net-shapes may be formed by applying a spray deposit to a mandrel or the like or by spray-filling a mold cavity. Suitable release agents and techniques will also be known.

Figure 4:
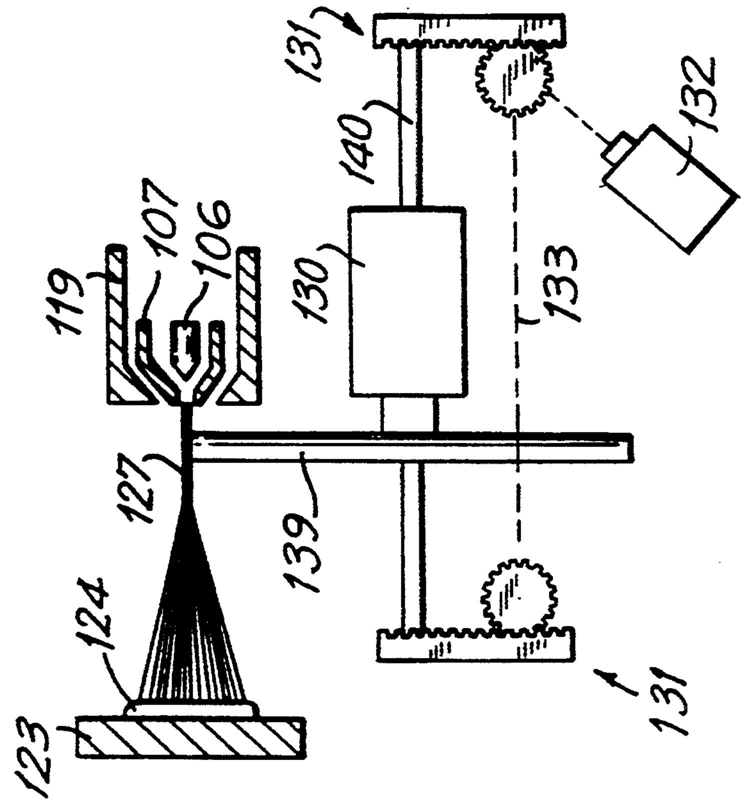
FIG. 4 is a schematic view of a high velocity thermal spray apparatus constructed in accordance with another embodiment of the invention in which a rotating disk is used as the feedstock material.

Reference is now made to FIG. 4 in which another embodiment of the invention is provided. Like numerals are utilized to define like structures. The basic structure of TAP torch assembly 10 is identical to that fully described in connection with FIG. 2 the difference being that the wire 122 is omitted and is replaced by a rotating disk 139 composed of the feedstock material.

Two rack and pinion assemblies 131 are driven by a common motor 132 and coupled by a common drive shaft 133. A motor 130 is supported by a member 140 coupled with the two rack and pinion drives 131. Rotating disk 139 is supported on motor 130 and rotated thereby.

Disk 139 is aligned so that the plane of the face of disk 139 is perpendicular to the central axis of TAP torch assembly 10 and that the center line of the disk 139 is parallel to the central axis of TAP torch assembly 10. Disk 139 is rotated by motor drive 130 and the edge of the disk 139 is melted and propelled by the transferred-arc plasma 127. Simultaneously with the continuous melting-off of the outer edge of disk 139, the disk is continuously adjusted in its position relative to the axis of TAP torch assembly 10 by rack and pinion assemblies 131. As the disk edge is melted, the molten droplets thus formed are atomized and propelled by means of the plasma stream 127 to the substrate 123 to form a deposit 124.

Similarly, as can readily be understood, a reciprocating rectangular bar or plate may be substituted for the rotating disk 139, melting one edge of the bar as it is traversed in front of TAP torch assembly 10 and, similarly to the rotating disk embodiment, the position of the edge of bar is continuously adjusted to compensate for the melt-off. Accordingly, a greater quantity of metal feedstock may be placed in the plasma jet at a single time for a given thickness of feedstock. It is also contemplated to utilize two adjacent rotating disks disposed on opposed sides of the plasma jet. The disks are positioned so that the plasma jet melts away a portion of both disks at the tangent of the respective disk edges with each other.

Figure 6:
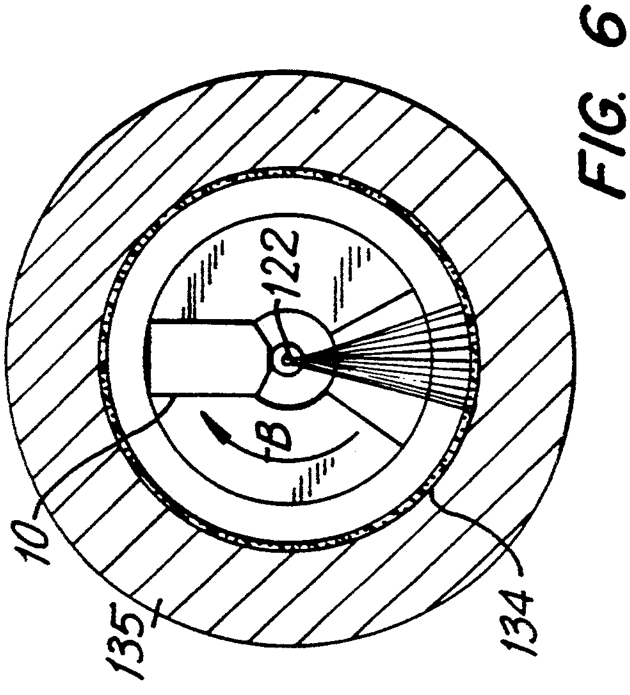
FIG. 6 is a sectional view taken along line 6—6 of FIG. 5.
Figure 5:
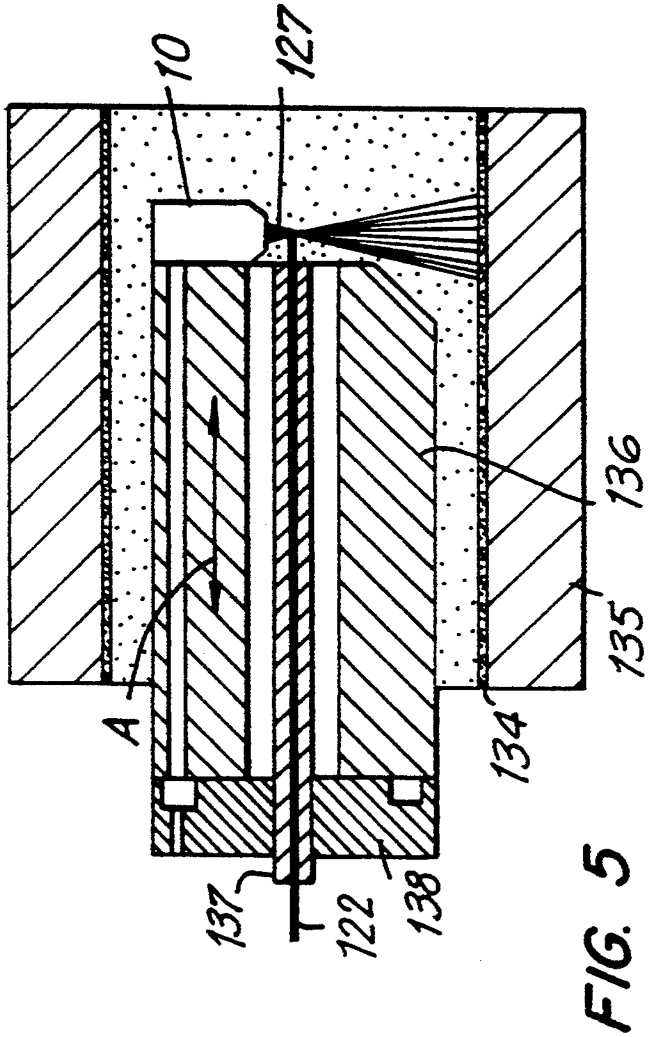
FIG. 5 is a cross-sectional view of the transferred-arc plasma torch constructed in accordance with another embodiment of the invention.

Reference is now made to FIGS. 5 and 6 in which a cross-section and end view diagram of a TAP torch assembly 10 to be employed in a manner suitable for depositing a uniform coating 134 on the surface of concave surface such as a bore 135 is shown. This embodiment includes a TAP torch assembly 10 similar to TAP torch assembly 10 described in FIG. 2, the difference being that TAP torch assembly 10 is mounted on a rotating member 136 to allow rotation concentrically with respect to bore 135 by means of a motor drive, not shown.

A rotating member 136 is mounted on a stationary end plate 138. Rotating member 136 is formed with an insulating wire feed conduit 137 extending through its rotation axis. TAP torch assembly 10 is mounted at an end of rotating member 136 opposite that of stationary end plate 138 on the radius of rotating member 136 so that plasma jet 127 extends towards insulating wire feed conduit 137.

Wire 122 is fed on the central axis of the bore through wire feed conduit 137 which is kept electrically isolated from the rotating member 136 by means of the rigid, electrically insulating wire feed conduit 137. The gas and electrical connections to the TAP torch assembly 10 are brought through the stationary end plate 138 to and through the rotating member 136 to TAP torch assembly 10. Stationary end plate 138 is maintained in pressure contact with the end of rotating member 136 by pressure means, not shown. TAP torch assembly 10 is positioned in relationship to the wire 122 exactly as is described and shown in FIG. 2.

A transferred-arc plasma 127 is established as previously described, melting off the tip of the wire 122 as it is continuously fed into plasma jet 127. As it is melted off from the wire tip, the molten droplets are atomized and propelled by the plasma stream towards the inner wall of the bore 135. As the rotating member 136 and the TAP torch assembly 10 are rotated in the direction of arrow B (FIG. 6), a coating 134 is deposited uniformly on the wall of the bore. While the deposit is being formed by the rotational movement, the assembly consisting of the wire feed conduit 137, wire 122, stationary end plate 138, rotating member 136 and TAP torch assembly 10 is reciprocated axially in the direction of arrow A, up and back within the bore 135, thereby causing the deposit to form all along the circumference of the bore 135 as well as covering the length of the bore 135. By these combined motions and actions, bore 135 is completely covered with a uniform deposit 134.

In the prior art, it has been commonly known that if it is desired to apply a thermal spray coating to an internal cylindrical surface, a thermal spray apparatus equipped with a deflector head, deflecting the spray pattern nearing 90° is employed and the part to be coated is independently rotated while the thermal spray apparatus is reciprocated up and back along the axis of the concave surface to provide a uniform coating to the internal surface of the concave surface. However, it is not always practical or possible to rotate the part to be coated, such as an automobile engine block, when it is desired to apply a coating to the cylinder bores contained within the engine block. By providing a TAP torch assembly which is rotatably mounted about a wire, the wire being fed at an angle of at least 90° relative to the plasma jet a practical process for applying coatings to the inner surface of a concave structure such as a bore is provided.

It will thus be seen that the objects set forth above, among those made apparent from the preceding description, are efficiently attained and since certain changes may be made in carrying out the above method and in the constructions set forth without departing from the spirit and the scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A method for forming matrix metal composite utilizing a transferred-arc-plasma torch assembly which forms a transferred-arc column and plasma jet comprising the steps of feeding a metal wire into said transferred-arc column at an angle such that no portion of said metal wire is closer to said transferred-arc-plasma torch assembly than the leading edge of said metal wire during operation as said leading edge of said metal wire intersects a plasma flow:

creating an electrical potential difference between said metal wire leading edge and said transferred-arc-plasma torch assembly; and feeding a powder downstream of said metal wire in the plasma jet path.

2. The method of claim 1, wherein said plasma jet has a central axis and further comprising the step of feeding said powder at an angle of substantially 90° with respect to said central axis of said plasma jet.

3. The method of claim 1, further comprising the step of feeding said powder at an angle of substantially 180° with respect to said metal wire.

4. The method of claim 1, wherein said powder is fed downstream of a central axis of said metal wire a distance at least as great as the radius of said wire.

5. The method of claim 1, further comprising the step of forming molten droplets of metal at the tip of said metal wire, conveying said molten droplets in said plasma jet, and embedding said powder into said molten droplets.

6. The method of claim 1, further comprising the step of forming a supersonic plasma jet.

7. The method of claim 1, wherein said powder feedstock is selected from the group consisting of a refractory material, metal oxides and carbon whiskers.

8. The method of claim 1, further comprising the step of forming the metal wire from the group consisting of titanium, aluminum, steel and nickel and copper based alloys.

9. A method for forming a matrix metal composite utilizing a transferred-arc-plasma torch assembly which forms a transferred-arc column and plasma jet comprising the steps of feeding a metal wire having a central axis into said transferred-arc column at an angle such that no portion of said metal wire is closer to the transferred-arc-plasma torch assembly than the leading edge of said metal wire as said leading edge intersects a plasma flow;

creating an electrical potential difference between said metal wire leading edge and said transferred-arc-plasma torch assembly; and feeding a powder downstream of said metal wire in the plasma jet path;

feeding said powder at an angle of substantially 90° with respect to said plasma jet downstream of said central axis of said metal wire, a distance at least as great as the radius of said wire;

forming molten droplets of metal at the tip of said metal wire;

conveying said molten droplets in said plasma stream; and embedding said powder into said molten droplets.

10. A method of coating a concave surface utilizing an apparatus including a rotating member having a wire conduit formed therein, said rotating member rotating about said wire conduit, transferred-arc-plasma torch assembly means for forming a transferred-arc column mounted on said rotating member, wire feeding means for feeding a conductive wire of coating material through said wire conduit and into said transferred-arc column at an angle such that no portion of said conductive wire is closer to the transferred-arc-plasma torch assembly means than the leading edge of said conductive wire, power source means coupled to said conductive wire and said transferred-arc-plasma torch assembly means for energizing said transferred-arc-plasma torch assembly means and said conductive wire to create an electrical potential difference therebetween forming said transferred-arc column, comprising tire steps of:

positioning said rotating member within said concave surface with said wire located generally in tire axis of said concave surface;

feeding said conductive wire into said transferred-arc column generating a stream of particles of said coating material directed radially toward said concave surface;

rotating said rotating member about said wire conduit generating said stream of particles radially across said concave surface and forming a generally even coating of said coating material on said concave surface; and reciprocally moving said rotating member between a first direction along the axis of said concave surface and a second opposite direction along tile axis of said concave surface coating said concave surface with said coating material.

11. A method of coating an internal surface of a generally cylindrical bore utilizing an apparatus including a rotating member having a wire conduit therein, said rotating member rotating about said wire conduit, a transferred-arc plasma torch assembly mounted on said rotating member, wire feed means for feeding a conductive wire of coating material through said wire conduit into said transfer-are column, a power source coupled to said conductive wire and said transferred-arc-plasma torch assembly energizing said transferred-arc-plasma torch assembly and said conductive wire to create an electrical potential difference therebetween forming a transferred column, comprising the following steps:

positioning said rotating member within said bore with said conductive wire located generally along the axis of said bore;

feeding said conductive wire into said transferred-arc column generating a stream of particles of said coating material directed radially toward said internal surface of said generally cylindrical bore;
rotating said rotating member about said wire conduit directing said stream of coating particles radially across said internal surface and forming a generally uniform coating on said internal surface; and
moving said rotating member generally along the axis of said bore uniformly coating the internal surface of said bore with said coating material.

* * * * *

UNITED STATES PATENT AND TRADEMARK OFFICE

CERTIFICATE OF CORRECTION

PATENT NO. : 5,442,153
DATED : August 15, 1995
INVENTOR(S) : Marantz et al.

It is certified that error appears in the above-indentified patent and that said Letters Patent is hereby corrected as shown below:

On the title page, insert the following:

[73] Assignee: Flame-Spray Industries, Inc.,
Port Washington, NY

Signed and Sealed this

Fourteenth Day of May, 1996

Attest:

BRUCE LEHMAN

*Attesting Officer*

*Commissioner of Patents and Trademarks*